US012734969B2

(12) United States Patent
Laski

(10) Patent No.: US 12,734,969 B2
(45) Date of Patent: Sep. 15, 2026

(54) METHODS AND APPARATUS FOR A MODULAR VEHICLE CARGO CAVITY FRAME

(71) Applicant: Derek Laski, Washington, MI (US)

(72) Inventor: Derek Laski, Washington, MI (US)

( * ) Notice: Subject to any disclaimer, the term of this patent is extended or adjusted under 35 U.S.C. 154(b) by 374 days.

(21) Appl. No.: 18/498,169

(22) Filed: Oct. 31, 2023

(65) Prior Publication Data

US 2024/0140317 A1 May 2, 2024

Related U.S. Application Data

(60) Provisional application No. 63/421,275, filed on Nov. 1, 2022.

(51) Int. Cl.
*B60R 5/00* (2006.01)

(52) U.S. Cl.
CPC .................................... *B60R 5/003* (2013.01)

(58) Field of Classification Search
CPC ....... B60R 5/003; B62B 2206/02; B62B 3/02; B62B 3/002; B62D 63/061
See application file for complete search history.

(56) References Cited

U.S. PATENT DOCUMENTS 2,730,373 A * 1/1956 Blevins ................. F24C 15/086 280/35
5,249,823 A * 10/1993 McCoy ..................... B62B 3/02 280/87.01
5,599,031 A * 2/1997 Hodges ................. B62B 5/0083 280/35
6,065,792 A * 5/2000 Sciullo .................... B60P 1/003 414/522
6,095,533 A * 8/2000 Balolia ..................... B60T 1/14 188/19
6,109,625 A * 8/2000 Hewitt ................... F16M 11/18 280/43.24
6,312,034 B1 11/2001 Coleman, II et al.
6,669,213 B2 * 12/2003 Woerner ................ B62B 3/002 280/47.35
7,543,872 B1 * 6/2009 Burns ..................... B60P 1/003 296/37.16

(Continued)

FOREIGN PATENT DOCUMENTS

CA 2432267 A1 * 12/2004
CN 108382434 A * 8/2018 ............... B62B 3/02

(Continued)

OTHER PUBLICATIONS

Translated CN-108382434-A (Year: 2026).*
Extendobed, Slideout Units, Truck Bed Slide Out Trays, https://www.extendobed.com/slideout-units/ (visited on Mar. 17, 2022).

(Continued)

*Primary Examiner* — James A Shriver, II
*Assistant Examiner* — Ian Bryce Shelton

(57) ABSTRACT

A vehicle cargo cavity frame that is adjustable to fit a vehicle cargo cavity. Disclosed is a vehicle cargo cavity frame kit that has a proximal supporting member, a distal supporting member at least two longitudinal supporting members, and a plurality of wheels. The proximal supporting member, distal supporting member, each longitudinal supporting member, and each wheel is configured to interconnect to each other through an adjustment mechanism to transition from a collapsed configuration to an assembled configuration.

9 Claims, 7 Drawing Sheets

(56) References Cited

U.S. PATENT DOCUMENTS

| | | | | |
|---|---|---|---|---|
| 9,168,874 | B2 | 10/2015 | Smith et al. | |
| 11,097,759 | B1 * | 8/2021 | Poudrier | B62B 3/008 |
| 12,187,336 | B2 * | 1/2025 | Hanlon | B62B 3/16 |
| 2003/0030239 | A1 * | 2/2003 | Woerner | B62B 3/006 280/47.35 |
| 2018/0345872 | A1 | 12/2018 | Kraeuter et al. | |
| 2020/0130719 | A1 * | 4/2020 | Saeli | B62B 3/02 |
| 2020/0361504 | A1 * | 11/2020 | Prescott | B60B 33/0068 |
| 2023/0024997 | A1 * | 1/2023 | Hanlon | B62B 3/008 |

FOREIGN PATENT DOCUMENTS

| | | | | |
|---|---|---|---|---|
| DE | 202008007158 | U1 * | 8/2008 | B62B 3/02 |
| KR | 101184059 | B1 * | 9/2012 | B60R 7/02 |

OTHER PUBLICATIONS

Real Truck, Bedslide S Truck Bed Cargo Slide, https://realtruck.com/p/bedslide-s-truck-bed-cargo-slide/ (visited on Feb. 9, 2022).

Amazon, Zinus Michelle Compack Adjustable Steel Bed Frame for Box Spring and Mattress Set, Fits Twin to Queen sizes, https://www.amazon.com/Zinus-Compack-Adjustable-Spring-Mattress/dp/B015IHMK5C/ref%3Dsr_1_5?dchild=1&keywords=metal+bed+frame&qid=1633453137&sr=1-5 (visited on Mar. 25, 2022).

Bedslide, Bedslide 1000 Classic, https://www.bedslide.com/series-2-bedslide-1000-classic.html (visited May 26, 2022).

Real Truck, Cargoglide CG1000 Truck Bed Cargo Slide, https://realtruck.com/p/cargoglide-cg1000-truck-bed-cargo-slide/v/dodge/ram-2500/2002/ (visited on May 26, 2022).

Real Truck, Decked Truck Bed Storage System, https://realtruck.com/p/decked-truck-bed-storage-system/ (visited on Dec. 5, 2021).

* cited by examiner

METHODS AND APPARATUS FOR A MODULAR VEHICLE CARGO CAVITY FRAME

CROSS-REFERENCE TO RELATED DISCLOSURE

The present disclosure claims the benefit of U.S. Provisional Application No. 63/421,275 filed on Nov. 1, 2022, the disclosure of which being hereby incorporated herein by reference in entirety.

FIELD OF THE DISCLOSURE

The present invention relates to automotive accessories, more particularly, to cargo cavity accessories.

BACKGROUND

Vehicles such as trucks or vans typically have a large usable cargo space in the trunk and/or bed of the vehicle. These cargo cavities are typically used to store items during transportation which may include anything from groceries to work tools to furniture. Most people buy these vehicles with large cargo cavities for such purposes. However, the cargo space in a conventional vehicle can be difficult to access making it largely unusable.

People who own large vehicles such as trucks or cargo vans typically run into the issue of being unable to reach items within the cargo cavity that have shifted during transportation. Large-scale cargo cavity drawer or flatbed rail systems are excessively heavy and burdensome for the average person who does not own their vehicle for the purpose of employment or industry. One major drawback of these current systems is that they are custom manufactured for a specific vehicle make and model and are permanently affixed to the cargo cavity of that individual vehicle. This proves to be very inconvenient for the lay user who changes vehicles, often to a different make or model than the one previously owned. This means that these expensive, heavy, personally customized cargo cavity storage/rail systems will not transfer to the owner's new vehicle and they are left with the decision of purchasing an entirely new one at great cost or foregoing the convenience of having the system in the first place.

Thus, there is an unmet need for a device that offers the convenience of retrieving items that would normally be hard to reach in a vehicle cargo cavity while also being adjustable so the vehicle owner may transfer the device from vehicle to vehicle. The present disclosure addresses such a need, among others.

SUMMARY

The present disclosure provides a cargo cavity frame to allow the user of a vehicle with a cargo cavity to access items therein. The cargo cavity frame described herein includes an adjustment mechanism to adjust the size of the frame to fit various sizes of cargo cavities. The following examples are provided herein:

Example 1 includes a vehicle cargo cavity frame comprising, a proximal supporting member, a distal supporting member, at least two longitudinal supporting members, and a plurality of wheels, wherein a longitudinal distance between the proximal supporting member and the distal supporting member is adjustable to fit vehicle cargo cavities of various lengths.

Example 2 includes the frame of example 1 wherein the longitudinal supporting members further include a plurality of holes displaced along at least an outer side of the longitudinal supporting members configured to interconnect the wheels to the longitudinal supporting members and to adjust the placement of the wheels along the longitudinal supporting members.

Example 3 includes the frame of example 1 further including at least two transverse supporting members configured to adjust a transverse distance between the longitudinal supporting members.

Example 4 includes the frame of example 3 further including at least four corner supporting members configured to couple the transverse supporting members to the longitudinal supporting members.

Example 5 includes the frame of example 4 wherein the transverse supporting members and the corner supporting members further include a plurality of holes displaced along at least an outer side configured to interconnect the transverse supporting members to the corner supporting members and to interconnect the corner supporting members to the longitudinal supporting members.

Example 6 includes the frame of example 5 wherein the longitudinal supporting members, transverse supporting members, and corner supporting members further include a plurality of holes displaced along at least an upper side, wherein the longitudinal supporting members, transverse supporting members, and corner supporting members interconnect to a base through the plurality of holes.

Example 7 includes the frame of example 6 further including at least two item stop members, each item stop member further including a plurality of holes displaced on at least a bottom side configured to couple the item stop members to the base through the plurality of holes.

Example 8 includes the frame of example 1 further including at least two medial supporting members extending in the transverse direction, wherein the medial supporting members are configured to couple with the longitudinal supporting members and to couple the two medial supporting members together.

Example 9 includes the frame of example 8 wherein the medial supporting members further include a plurality of holes displaced along at least an outer side and an upper side configured to interconnect the medial supporting members together and to interconnect the medial supporting members to the longitudinal supporting members.

Example 10 includes the frame of example 1 further including at least four stop bumpers disposed at the proximal and distal ends of the frame.

Example 11 includes a vehicle cargo cavity frame kit comprising, a proximal supporting member, a distal supporting member, at least two longitudinal supporting members, and a plurality of wheels, wherein the proximal supporting member, distal supporting member, each longitudinal supporting member, and each wheel is configured to interconnect to each other through an adjustment mechanism to transition from a collapsed configuration to an assembled configuration.

Example 12 includes the frame kit of example 11 wherein the adjustment mechanism further includes a plurality of holes displaced along at least an outer side of the proximal supporting member, distal supporting member, and each longitudinal supporting member, such adjustment mechanism configured to adjust a longitudinal distance between the proximal supporting member and distal supporting member and also configured to adjust a transverse distance between the longitudinal supporting members.

Example 13 includes the frame kit of example 11 further including at least two transverse supporting members, each transverse supporting member further including an adjustment mechanism configured to interconnect the transverse supporting members to the longitudinal supporting members.

Example 14 includes the frame kit of example 13 further including at least four corner supporting members, each corner supporting member further including an adjustment mechanism configured to interconnect the transverse supporting members to the corner supporting members and to interconnect the corner supporting members to the longitudinal supporting members.

Example 15 includes the frame kit of example 14 wherein the adjustment mechanism further includes a plurality of holes displaced along at least an outer side of the transverse supporting members and corner supporting members.

Example 16 includes the frame kit of example 15 wherein the longitudinal supporting members, transverse supporting members, and corner supporting members further include a plurality of holes displaced along at least an upper side, wherein the longitudinal supporting members, transverse supporting members, and corner supporting members interconnect to a base through the plurality of holes.

Example 17 includes the frame kit of example 15 further including at least two item stop members, each item stop member further including a plurality of holes displaced on at least a bottom side configured to couple the item stop members to the base through the plurality of holes.

Example 18 includes the frame kit of example 11 further including at least two medial supporting members extending in the transverse direction, wherein the medial supporting members are configured to couple with the longitudinal supporting members and to couple the two medial supporting members together, said medial supporting members further include a plurality of holes displaced along at least an outer side configured to interconnect the medial supporting members together and a plurality of holes displaced along an upper side configured to interconnect the medial supporting members to the longitudinal supporting members.

Example 19 includes the frame kit of example 11 further including at least four stop bumpers, wherein at least two stop bumpers are disposed at the proximal and distal ends of the frame.

Example 20 includes the frame kit of example 11 further including a packaging assembly that maintains the frame kit in the collapsed configuration.

Example 21 includes a method for packaging a vehicle cargo cavity frame kit comprising, including a proximal supporting member, a distal supporting member, at least two longitudinal supporting members, a plurality of wheels, and a series of hardware items for connecting the members and wheels together, producing an instructions manual, the instructions manual including instructions to assemble the vehicle cargo cavity frame from a collapsed configuration into an assembled configuration, aligning the proximal supporting member, distal supporting member, each longitudinal supporting member, and each wheel in the collapsed configuration, and applying a packaging to maintain the collapsed configuration during transportation, wherein the contents of the kit in the collapsed configuration can be separated from each piece configured to interconnect to form the assembled configuration.

Example 22 includes the method of example 22 further including aligning a medial supporting member in the collapsed configuration.

Example 23 includes the method of example 22 further including aligning a corner supporting member in the collapsed configuration.

Example 24 includes the method of example 22 further including aligning a transverse supporting member in the collapsed configuration.

Example 25 includes the method of example 22 wherein the collapsed configuration further includes a stop bumper.

BRIEF DESCRIPTION OF THE DRAWINGS

The figures are not to scale. Instead, the thickness of the layers or regions may be enlarged in the drawings. In general, the same reference numbers will be used throughout the drawing (s) and accompanying written description to refer to the same or like parts.

As used in this patent, stating that any part is in any way on (e.g., positioned on, located on, disposed on, or formed on, etc.) another part, indicates that the referenced part is either in contact with the other part or that the referenced part is above the other part with one or more intermediate part (s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B.

In addition, it should be understood that references to "one embodiment" or "an embodiment" of the present disclosure are not intended to be interpreted as excluding the existence of additional embodiments that also incorporate the recited features.

DETAILED DESCRIPTION

Figure 1:
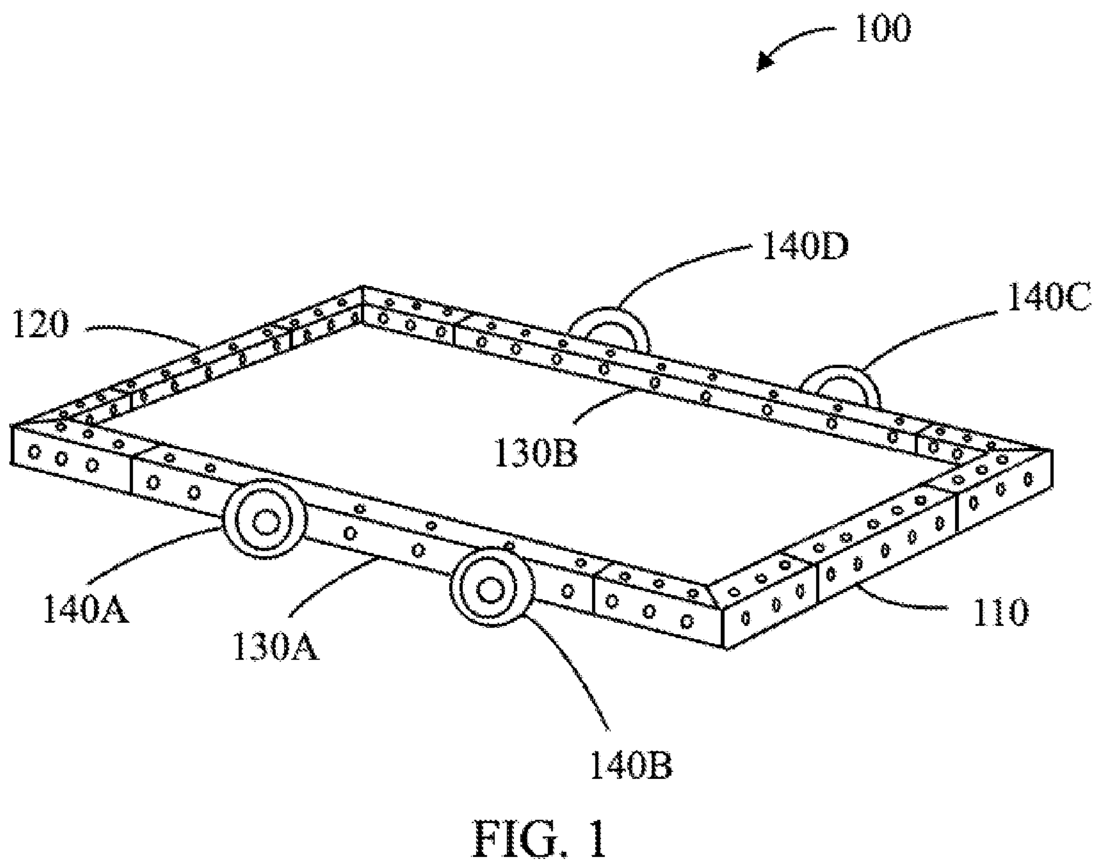
FIG. 1 is an elevated perspective view of a vehicle cargo cavity frame.

FIG. 1 is an isometric view of an example vehicle cargo cavity frame 100. The example vehicle cargo cavity frame 100 of the illustrated example of FIG. 1 includes a proximal supporting member 110, a distal supporting member 120, two longitudinal supporting members 130A, 130B (collectively 130), and a plurality of wheels 140A, 140B, 140C, 140D (collectively 140). In some examples, the distal supporting member 110 couples with the distal end of the longitudinal supporting members 130, the proximal supporting member 120 couples with the proximal end of the longitudinal supporting members 130, and the plurality of wheels 140 couples to the longitudinal supporting members 130.

In some examples, any number of wheels may be used to form the plurality of wheels 140. Further, in some examples, the plurality of wheels 140 is not limited to coupling to just the longitudinal supporting members 130. Any alternate configuration to achieve the goal of the invention described herein may be covered by an alternate embodiment. For example, an alternate embodiment may show a vehicle cargo cavity frame 100 in the shape of an oval or a parallelogram. In such examples, the plurality of wheels 140 may couple to an alternate location to achieve stability of the vehicle cargo cavity frame 100. In some examples, the plurality of wheels 140 may couple to the proximal supporting member 110 and/or the distal supporting member 120.

Figure 2:
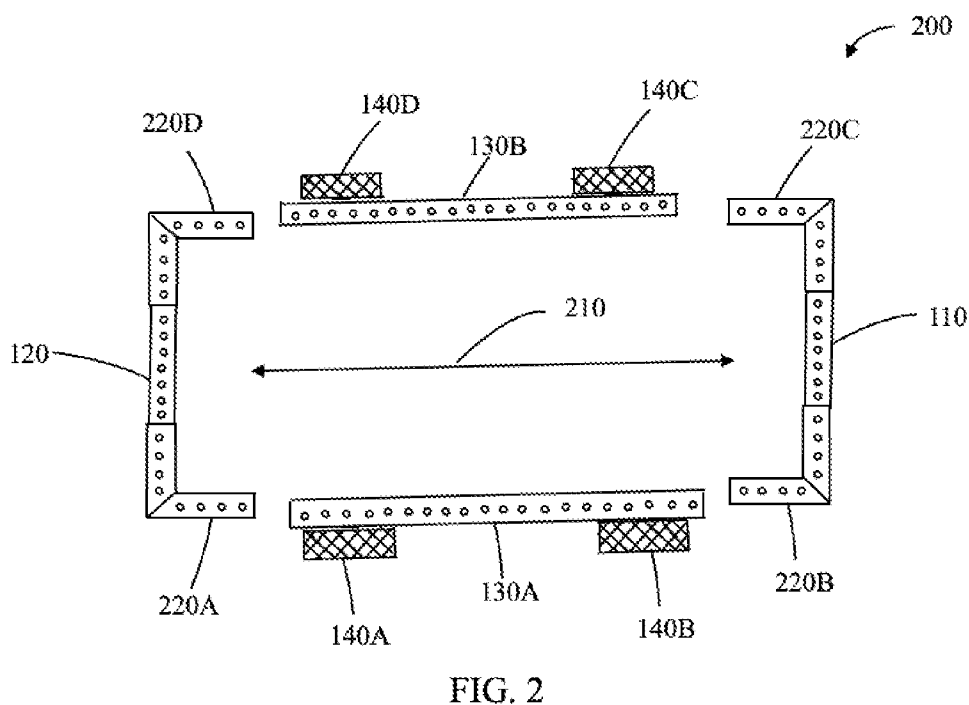
FIG. 2 is a top-down view of sections of the vehicle cargo cavity frame of FIG. 1.

FIG. 2 is a top-down view of the example vehicle cargo cavity frame 100 of FIG. 1. The top-down view of the example vehicle cargo cavity frame 200 includes a variable longitudinal distance 210. In some examples, the longitudinal distance 210 between the proximal supporting member 110 and the distal supporting member 120 is adjustable. In this example, the proximal supporting member 110 and the distal supporting member 120 interconnect with the longitudinal supporting members 130, where the proximal supporting member 110 and the distal supporting member 120 include longitudinal extending portions 220A, 220B, 220C, and 220D (collectively 220) that extend longitudinally and interconnect with the longitudinal supporting members 130. In this configuration, adjusting the interconnection between the longitudinally extending portions 220 and the longitudinal supporting members 130 adjusts a longitudinal distance 210. In some examples, the longitudinal extending portions 220 may be located on the longitudinal supporting members 130 instead and the proximal supporting member 110 and the distal supporting member 120 interconnect to the longitudinal extending portions 220 that are located on the longitudinal supporting members 130.

As described herein, "interconnected" refers to an overlapping, overlying, intersecting, etc. of one piece to another piece. This term is not to be confused with "coupled" as described above, as interconnected refers specifically to the physical contact of one piece to another piece where the two or more pieces overlap, overlay, intersect, etc. Unless otherwise specified, the term interconnected will be used as such.

Figure 3:
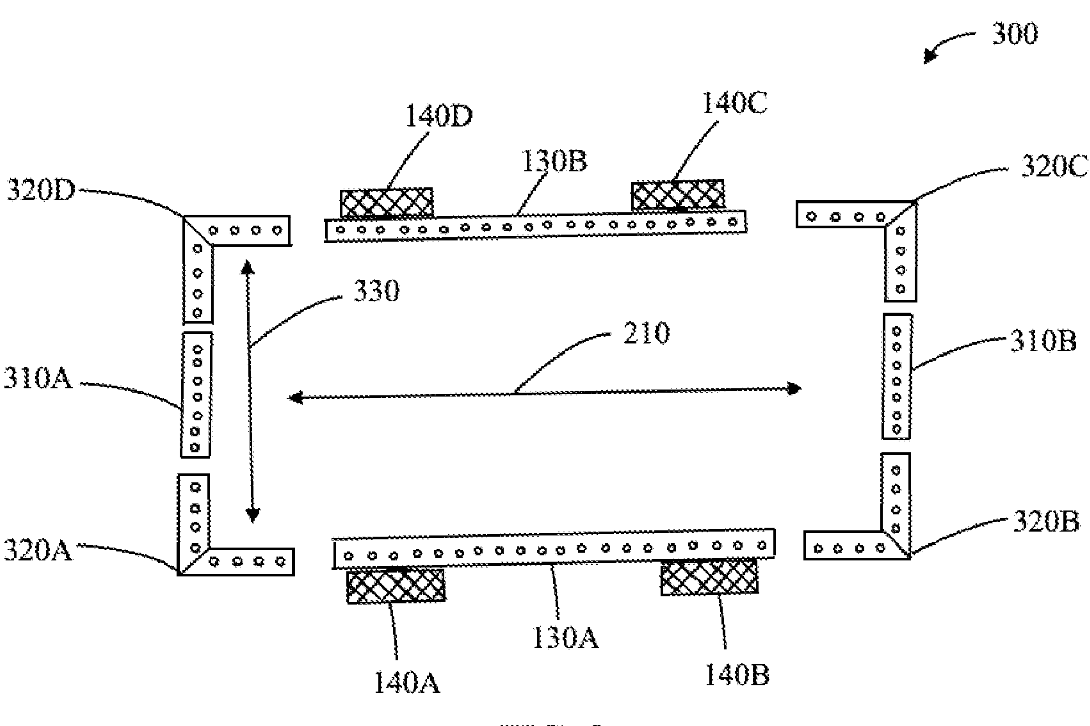
FIG. 3 is a top-down view of sections of an alternate embodiment of the vehicle cargo cavity frame of FIG. 1.

FIG. 3 is a top-down view of an alternative embodiment of the example vehicle cargo cavity frame 100 of FIG. 1. The first alternate embodiment 300 additionally includes two transverse supporting members 310A, 310B (collectively 310) and four corner supporting members 320A, 320B, 320C, 320D (collectively 320). In some examples, each of the transverse supporting members 310 interconnects to at least two of the four corner supporting members 320, and at least two of the four corner supporting members 320 interconnect to the longitudinal supporting members 130. In some examples, a transverse distance 330 is adjustable by adjusting the interconnection between the corner supporting members 320 and the transverse supporting members 310. Additionally, or alternatively, the longitudinal distance 210 is adjustable in this example by adjusting the interconnection between the corner supporting members 320 and the longitudinal supporting members 130.

In some examples, at least two of the four corner supporting members 320 are coupled with the longitudinal supporting members 130 and the transverse supporting members 310 interconnect with the corner supporting members 320. In this example, the transverse distance 330 is adjustable by adjusting the interconnection between the corner supporting members 320 and the transverse supporting members 310.

Figure 4:
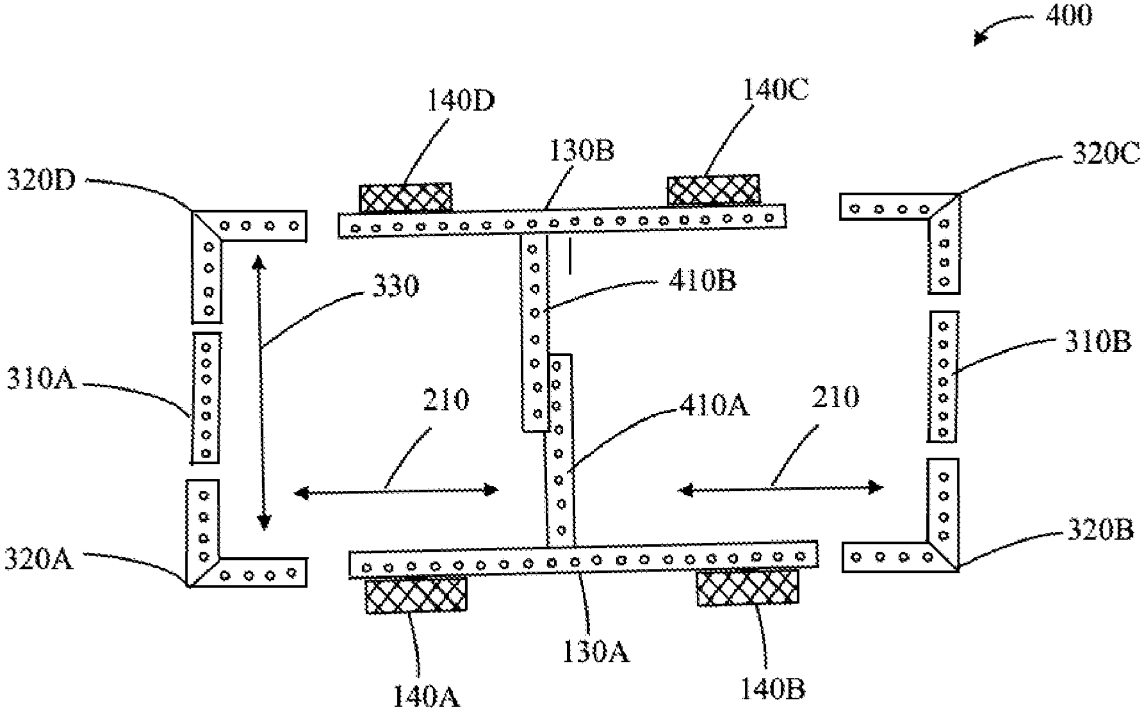
FIG. 4 is a top-down view of sections of another alternative embodiment of the vehicle cargo cavity frame of FIG. 3.

FIG. 4 is a top-down view of another alternative embodiment of the first alternative embodiment 300 of the illustrated example of FIG. 3. In some examples, the second alternate embodiment 400 may include two medial supporting members 410A, 410B (collectively 410) that extend in the transverse direction from each longitudinal supporting member 130. In some examples, only one medial supporting member 410 may be needed, however, the example provided herein shows at least two medial supporting members 410 that couple to the longitudinal supporting members 130. The medial supporting members 410 interconnect to each other in the transverse direction while still allowing for the transverse direction 330 as described in connection with FIG. 3 to be adjustable. Additionally, or alternatively, the longitudinal distance 210 is also adjustable using the same mechanism as described in connection with FIGS. 2 and/or 3.

Figure 5A:
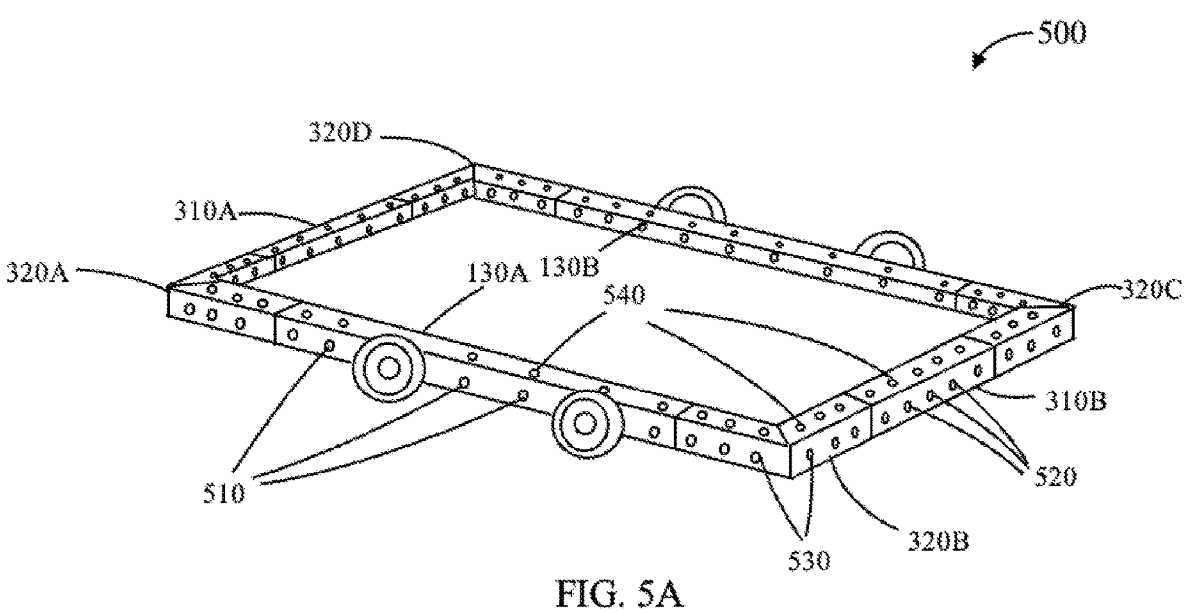
FIGS. 5A and 5B show an elevated perspective view of one example of an interconnection connection mechanism.

FIG. 5A shows an example connection mechanism for interconnecting the longitudinal supporting members 130, transverse supporting members 310, and corner supporting members 320 of the illustrated examples of FIGS. 1, 2, and/or 3. In some examples, the external side of the longitudinal supporting members 130 includes a plurality of holes 510, the external side of the transverse supporting members 310 includes a plurality of holes 520, and the external side of the corner supporting members 320 includes a plurality of holes 530. In some examples, the corner supporting members 320 interconnect to the longitudinal supporting members 130 through the plurality of holes 510 and 530, and the transverse supporting members 310 interconnect to the corner supporting members 320 through the plurality of holes 520 and 530.

In some examples provided herein, a nut-and-bolt style connection may be used to interconnect the members together through the plurality of holes 510, 520, and 530. Additionally, or alternatively, any form of connection method to interconnect two pieces of material together through a hole that exists on both pieces may be used, which can include, but is not limited to, nails, screws, anchors, clamps, etc. In some examples, the connection method may include a telescoping mechanism for extending and retracting the interconnected members.

In some examples, the top side of the longitudinal supporting members 130, the top side of the transverse supporting members 310, and the top side of the corner supporting members 320 includes a plurality of holes 540. Examples provided herein allow for a base to be connected to the example cargo cavity frame 100 through the plurality of holes 540. Further information related to the base is in reference to FIG. 7.

Figure 5B:
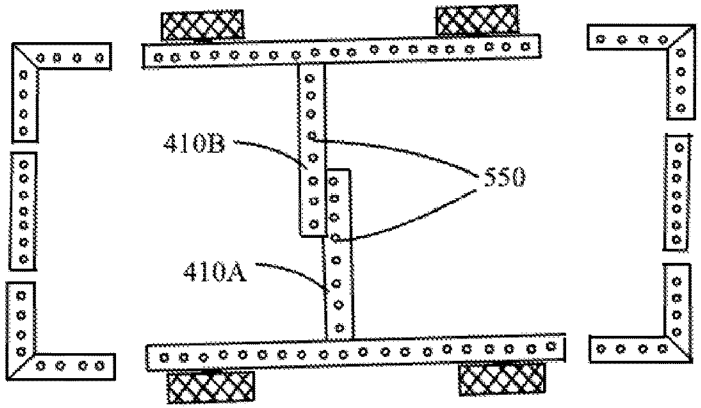

FIG. 5B shows an example connection mechanism for interconnecting the two medial supporting members 410 of the illustrated example of FIG. 4. Similar to that of the example connection mechanism of FIG. 5A, in some examples, the medial supporting members 410 may include a plurality of holes 550 on the proximal and/or distal side and the top side of the medial supporting members 410. The medial supporting members 410 may interconnect to each other through the plurality of holes 550 on the proximal and/or distal side of the medial supporting member 410 via, for example, a nut-and-bolt style connection or any other form of connection method to interconnect two pieces of material together through a hole. The plurality of holes 550 on the top side of the medial supporting members 410 may be used to connect a base to the example cargo cavity frame 100 through the plurality of holes 550.

In some examples, the proximal supporting member 110, the distal supporting member 120, the longitudinal supporting members 130, the transverse supporting members 310, corner supporting members 320, and the medial supporting members 410 may be made of 1.5-inch galvanized perforated angle iron and cut to a length desired for the application and customizability. Alternatively, other metals such as aluminum, steel, etc., or plastics/carbon fiber may be used. In some examples, the plurality of holes 510-550 may measure 0.5-inch in diameter and be spaced 1-inch apart, when measuring the center of one hole to the center of the most adjacent hole. However, vehicle cargo cavities vary quite extensively, and thus different configurations of angle iron length and hole spacing may be desired to fit a specific class of vehicles.

Figure 6:
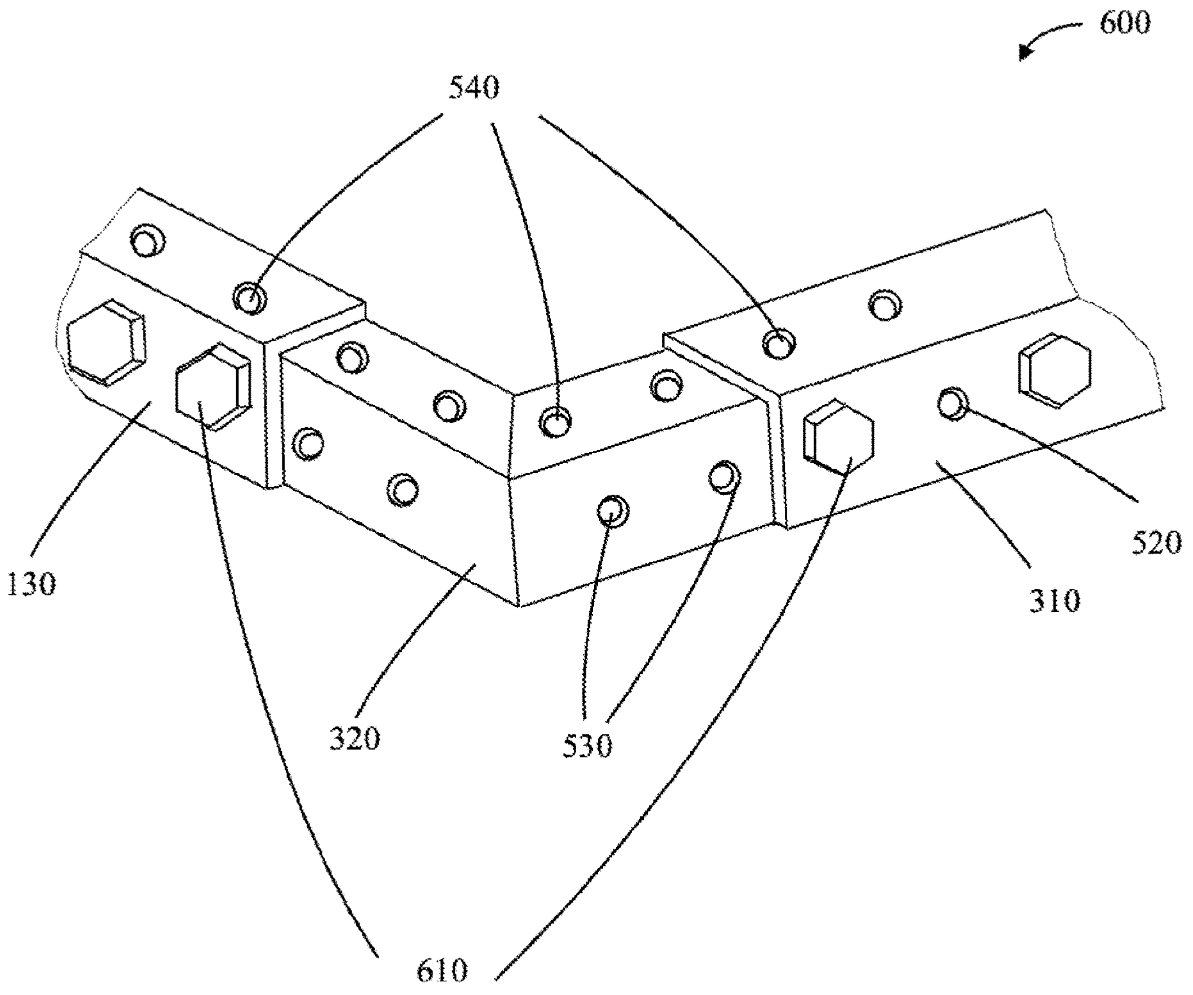
FIG. 6 is a detailed section view of a corner assembly of one embodiment of this disclosure.

FIG. 6 is a close-up view of a corner assembly 600 of the first alternative embodiment 300 of FIG. 3 and/or the second alternative embodiment of FIG. 4. The corner assembly 600 includes one of the longitudinal supporting members 130, one of the transverse supporting members 310, and one of the corner supporting members 320. As illustrated in FIG. 6, a standard nut-and-bolt style connection 610 is used to interconnect the one of the longitudinal supporting members 130 to the one of the corner supporting members 320 through the plurality of holes 510 and 530 respectively on each member, as defined in FIG. 5A. Likewise, the nut-and-bolt style connection 610 interconnects the one of the transverse supporting members 310 to the one of the corner supporting members 320 through the plurality of holes 520 and 530 respectively on each member, again as defined in FIG. 5A.

In some examples, the longitudinal distance 210 is adjusted by changing which of the plurality of holes 510 and 530 the nut-and-bolt style connection 610 uses to interconnect the longitudinal supporting members 130 to the corner supporting members 320. Additionally, or alternatively, the transverse distance 330 is adjusted by changing which of the plurality of holes 520 and 530 the nut-and-bolt style connection 610 uses to interconnect the transverse supporting members 310 to the corner supporting members 320.

Figure 7:
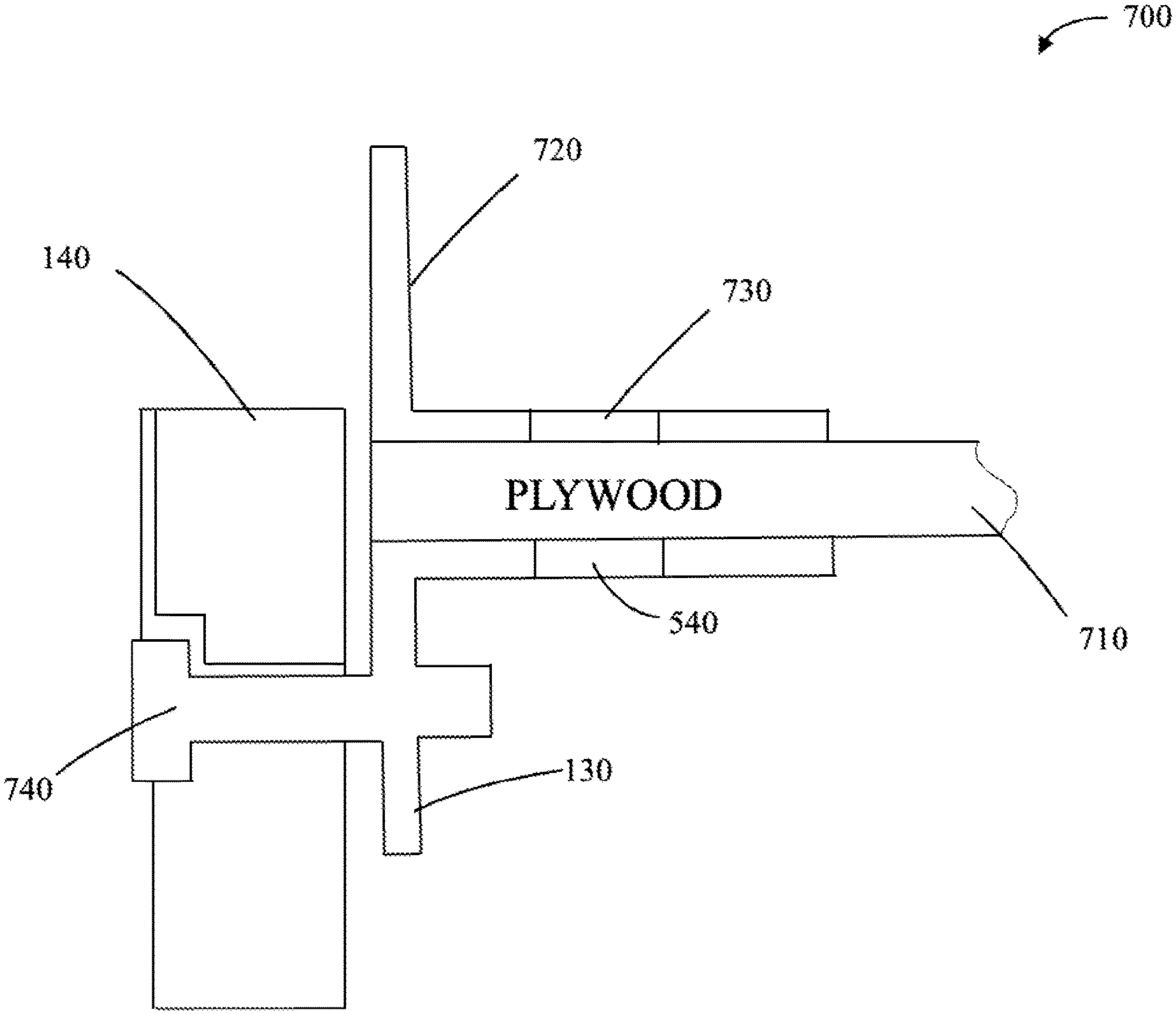
FIG. 7 is a cross-sectional view of one embodiment of a vehicle cargo cavity frame at a wheel assembly.

FIG. 7 is a cross-sectional view of the vehicle cargo cavity frame of FIGS. 1, 2, 3, and/or 4. The example cross-sectional view 700 of the illustrated example of FIG. 7 includes a base 710 and an item stop member 720. The item stop member may include a plurality of holes 730 displaced on at least a bottom side and is also similar to that of the other members listed herein with regards to the hole placement and material. In some examples, the base 710 is coupled to one of the longitudinal supporting members 130 by inserting a connection mechanism (such as a nut-and-bolt) through the base 710 and through one of the plurality of holes 540. The base 710 may, in some examples, also be coupled to the transverse supporting members 310, the corner supporting members 320, and/or the medial supporting members 410 by utilizing the same connection method through the plurality of holes 540 as described in FIG. 5A and/or the plurality of holes 550 as described in FIG. 5B.

In some examples, at least one item stop member 720 may be coupled to the base 710 by inserting a connection mechanism (such as a nut-and-bolt) through one of a plurality of holes 730 displaced on at least a bottom side of the item stop member 730 through the base 710 and also through one of the plurality of holes 540 on one of the longitudinal supporting members 130. The item stop member 720, as used in the examples described herein, provides a mechanism for prohibiting items from falling off the sides of the vehicle cargo cavity frame 100 while in transportation. The vehicle cargo cavity frame 100 may include more than one item stop member 720, at least to couple to the base 710 at the location of each longitudinal supporting member 130. The base may be made of a plywood material or any other form of sturdy base material which may include plastic, metal, etc., and may also include shapes that are collapsible and/or foldable.

In some examples, the plurality of wheels 140 may include a hole displaced on the middle of the wheel to provide a mechanism for connecting the wheel to the vehicle cargo cavity frame 100. As illustrated in FIG. 7, one of the plurality of wheels 140 is coupled to one of the longitudinal supporting members 130, through one of the plurality of holes 510, via a similar nut-and-bolt connection 740 as that of FIG. 6. The placement of the wheels on the vehicle cargo cavity frame 100 is thus adjustable as any of the plurality of holes 510, 520, and/or 530 may be used to couple the plurality of wheels 140 to the vehicle cargo cavity frame 100.

Figure 8:
FIG. 8 is a front view of the vehicle cargo cavity frame of FIG. 1.
Figure 8:
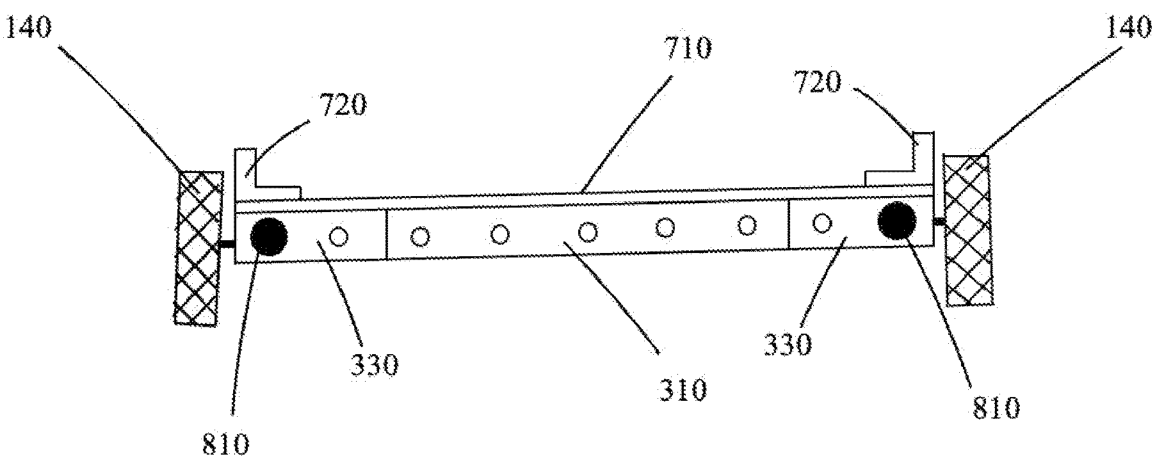

FIG. 8 is a front view 800 of the vehicle cargo cavity frame 100 of FIG. 1. In some examples, the vehicle cargo cavity frame 100 may include at least four stop bumpers 810 disposed on at least a proximal end and a distal end of the vehicle cargo cavity frame 100. In some examples, the stop bumpers 810 may be coupled to the proximal supporting member 110 and/or the distal supporting member 120. In some examples, the stop bumpers 810 may be coupled to the corner supporting members 320 and/or the transverse supporting members 310. The stop bumpers 810 provide a mechanism for reducing connection damage between the vehicle cargo cavity frame 100 and the vehicle cargo cavity, especially during transportation.

During operation, the vehicle cargo cavity frame 100 may be placed within the cargo cavity of a vehicle. While the tailgate/rear door is closed, the vehicle cargo cavity frame 100 sits flush with the proximal and distal ends of the cargo cavity. In some examples, the configuration may require a non-flush interaction with the proximal and distal ends of the cargo cavity, such as if the vehicle has a toolbox or some other device within the cargo cavity.

In some examples, the vehicle cargo cavity frame 100 may roll along the floor of the cargo cavity until the front-most wheels are free of the cargo cavity. In this example, each longitudinal supporting member 130 rests on the cargo cavity while the wheels free-hang outside of the cargo cavity. This allows for the items to be more easily accessible while ensuring the vehicle cargo cavity frame 100 does not move further. At this point, a user may intervene to collect the items stored on the vehicle cargo cavity frame 100.

In some examples, each of the individual items described herein may be included in a kit combination. For example, the proximal supporting member 110, the distal supporting member 120, each longitudinal supporting member 130, and each of the plurality of wheels 140 may be included in the kit that is packaged and/or shipped as a combination unit. In some examples, the kit may also include the corner transverse supporting members 310, the corner supporting members 320, the medial supporting members 410, and/or the item stop members 720. In some examples, the kit may also include the interconnection mechanism (the nut-and-bolt style connection described herein) and/or the stop bumpers 810.

In some examples, each of the members/items included in the kit assembly may be packaged in a packaging for shipping. For example, the packaging may be sized in such a way to allow for each of the members/items to fit within the packaging, such packaging compliant with shipping guidelines and minimal for the application thereof.

In some examples, the vehicle cargo cavity frame 100 is shipped and/or stored in a collapsed configuration where each member/item is separated and/or in a collapsed orientation. Such a collapsed orientation may include each member/item being individually handled such that none of the members/items are coupled and/or interconnected in any way. In such an example, the longitudinal supporting members 130, the transverse supporting members 310, and/or the medial supporting members 410 can be laid such that they overlap each other to create a small footprint when each member is collapsed/separated. The corner supporting members 320 and the wheels 140 may also be oriented with respect to the other members in a similarly small footprint, where the longitudinal supporting members 130, the transverse supporting members 310, the medial supporting members 410, corner supporting members 320, and/or the wheels 140 are then packaged in a shipping box and/or a display box. Such a shipping configuration can be used to ship the collapsed configuration to a consumer. In other examples, the shipping/display box can be placed in a retail space where a consumer can purchase the collapsed configuration.

In some examples, the necessary hardware to transform the vehicle cargo cavity frame 100 from the collapsed configuration into an assembled configuration. Such hardware may include a plurality of screws, nuts, bolts, washers, clamps, etc. Additionally, in some examples, the collapsed configuration may include an instructions manual which includes instructions to assemble the vehicle cargo cavity frame 100 into the assembled configuration. Such an instructions manual may include instructions to allow a user to customize the size of the vehicle cargo cavity frame 100 to fit the desired cargo cavity.

In some examples, the collapsed configuration includes a substantially smaller footprint than the assembled configuration. The assembled configuration is representative of any of FIGS. 1-4, and may be sized as necessary to fit the desired cargo cavity. The vehicle cargo cavity frame 100 may be assembled to an assembled configuration by unfolding/interconnecting/coupling all of the members/items together in the designed configuration after shipping and/or storing is completed.

It is appreciated that this disclosure provides a method and apparatus for a vehicle cargo cavity frame that may be modular/adjustable. It is also appreciated that those skilled in the art may use the invention described herein and create a different embodiment which has the same features as the invention described herein. Thus, this disclosure covers not just the embodiments described herein, but any combination and/or modification of the disclosed embodiments that include the same features described herein.

What is claimed is:

1. A vehicle cargo cavity frame comprising:

a proximal supporting member;

a distal supporting member;

at least two longitudinal supporting members;

a plurality of wheels;

at least two transverse supporting members configured to adjust a transverse distance between the longitudinal supporting members;

at least four corner supporting members configured to couple the transverse supporting members to the longitudinal supporting members; and at least two item stop members;

wherein a longitudinal distance between the proximal supporting member and the distal supporting member is adjustable to fit vehicle cargo cavities of various lengths;

wherein the transverse supporting members and the corner supporting members further include a plurality of holes displaced along at least an outer side configured to interconnect the transverse supporting members to the corner supporting members and to interconnect the corner supporting members to the longitudinal supporting members;

wherein the longitudinal supporting members, transverse supporting members, and corner supporting members further include a plurality of holes displaced along at least an upper side, wherein the longitudinal supporting members, transverse supporting members, and corner supporting members interconnect to a base through the plurality of holes;

wherein each item stop member further comprising a plurality of holes displaced on at least a bottom side configured to couple the item stop members to the base through the plurality of holes.

2. The frame of claim 1 wherein the longitudinal supporting members further comprise a plurality of holes displaced along at least an outer side of the longitudinal supporting members configured to interconnect the wheels to the longitudinal supporting members and to adjust the placement of the wheels along the longitudinal supporting members.

3. The frame of claim 1 further comprising at least two medial supporting members extending in the transverse direction, wherein the medial supporting members are configured to couple with the longitudinal supporting members and to couple the two medial supporting members together, wherein the medial supporting members further include a plurality of holes displaced along at least an outer side and an upper side configured to interconnect the medial supporting members together and to interconnect the medial supporting members to the longitudinal supporting members.

4. The frame of claim 1 further comprising at least four stop bumpers disposed at the proximal and distal ends of the frame.

5. A vehicle cargo cavity frame kit comprising;

a proximal supporting member;

a distal supporting member;

at least two longitudinal supporting members;

a plurality of wheels;

at least two transverse supporting members, each transverse supporting member further comprising an adjustment mechanism configured to interconnect the transverse supporting members to the longitudinal supporting members and at least four corner supporting members, each corner supporting member further comprising an adjustment mechanism configured to interconnect the transverse supporting members to the corner supporting members and to interconnect the corner supporting members to the longitudinal supporting members; and at least two item stop members, each item stop member further comprising a plurality of holes displaced on at least a bottom side configured to couple the item stop members to the base through the plurality of holes;

wherein the proximal supporting member, distal supporting member, each longitudinal supporting member, and each wheel is configured to interconnect to each other through an adjustment mechanism to transition from a collapsed configuration to an assembled configuration;

wherein the adjustment mechanism further includes a plurality of holes displaced along at least an outer side of the transverse supporting members and corner supporting members, wherein the longitudinal supporting members, transverse supporting members, and corner supporting members further include a plurality of holes displaced along at least an upper side, wherein the longitudinal supporting members, transverse supporting members, and corner supporting members interconnect to a base through the plurality of holes.

6. The frame kit of claim 5 wherein the adjustment mechanism further includes a plurality of holes displaced along at least an outer side of the proximal supporting member, distal supporting member, and each longitudinal supporting member, such adjustment mechanism configured to adjust a longitudinal distance between the proximal supporting member and distal supporting member and also configured to adjust a transverse distance between the longitudinal supporting members.

7. The frame kit of claim 5 further comprising at least two medial supporting members extending in the transverse direction, wherein the medial supporting members are configured to couple with the longitudinal supporting members and to couple the two medial supporting members together, said medial supporting members further include a plurality of holes displaced along at least an outer side configured to interconnect the medial supporting members together and a plurality of holes displaced along an upper side configured to interconnect the medial supporting members to the longitudinal supporting members.

8. The frame kit of claim 5 further comprising at least four stop bumpers, wherein at least two stop bumpers are disposed at the proximal and distal ends of the frame.

9. The frame kit of claim 5 further comprising a packaging assembly that maintains the frame kit in the collapsed configuration.

* * * * *